United States Patent [19]

Nunes

[11] 4,079,926
[45] Mar. 21, 1978

[54] ENERGY ABSORBING SUPPORT

[75] Inventor: John Nunes, Concord, Mass.

[73] Assignee: Brunswick Corporation, Skokie, Ill.

[21] Appl. No.: 646,558

[22] Filed: Jan. 5, 1976

[51] Int. Cl.² .......................... F16F 1/06; F16F 15/06
[52] U.S. Cl. .............................. 267/176; 248/358 AA;
267/151; 267/166
[58] Field of Search ................ 267/60, 61 R, 62, 166,
267/167, 174–178, 170, 151; 29/191.6, 196.3;
248/7, 20, 21, 54 R, 54 CS, 358 AA

[56] References Cited

U.S. PATENT DOCUMENTS

| | | | |
|---|---|---|---|
| 1,931,708 | 10/1933 | Ross | 267/61 R |
| 2,056,816 | 10/1936 | Zimmerli | 267/170 X |
| 3,212,865 | 10/1965 | Miller | 29/196.3 |
| 3,243,154 | 3/1966 | Holmes et al. | 248/358 AA |
| 3,282,660 | 11/1966 | Pendleton et al. | 29/196.3 X |
| 3,411,806 | 11/1968 | Bellairs | 267/60 X |
| 3,704,877 | 12/1972 | Nunes et al. | 267/166 |
| 3,966,425 | 6/1976 | Takeo | 29/191.6 |

FOREIGN PATENT DOCUMENTS 1,276,066 12/1961 France .................... 267/152

Primary Examiner—Johnny D. Cherry
Attorney, Agent, or Firm—John G. Heimovics; David S. Guttman; Sheldon L. Epstein

[57] ABSTRACT

An energy absorbing support formed of a composite coil defining a core and a tubular sheath with the sheath being formed of a material having a higher elastic yield strain limit than that of the core. The coil defines a first portion and a second portion with a support of the coil disposed intermediate the first and second portions. Structure is provided for applying a preselected preload to the coil. The coil materials are preselected to maintain elastic and damping characteristics at cryogenic temperatures, such as below −150° F. The support is adapted for use in rigorous environments such as encountered in the space shuttle and the like, and provides lightweight, long life, resilient support of critical elements, such as piping and the like, therein.

17 Claims, 8 Drawing Figures

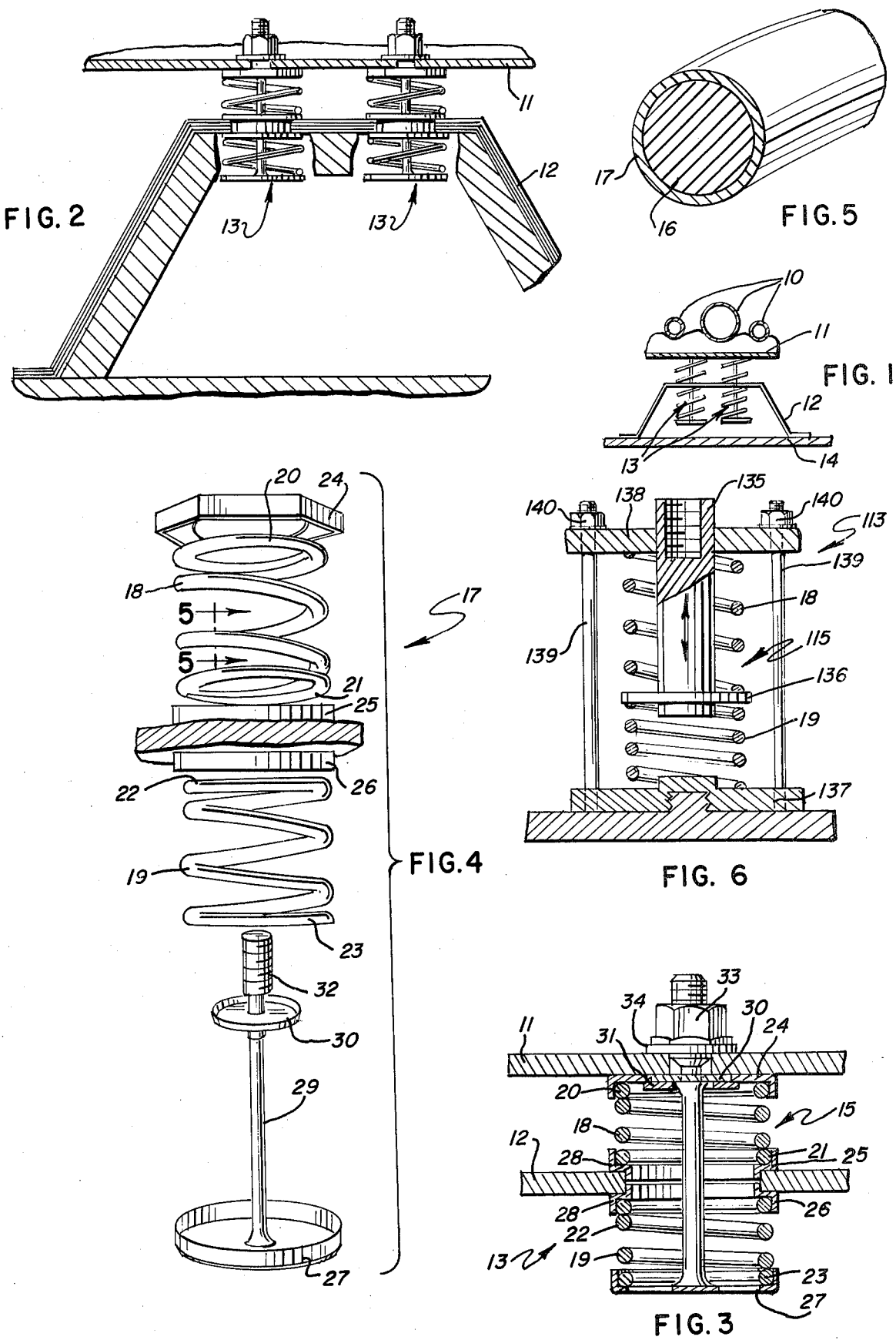

4,079,926

ENERGY ABSORBING SUPPORT

BACKGROUND OF THE INVENTION

1. Field of the Invention

This invention relates to spring-type supports and in particular to spring-type supports for use in extreme temperature environments of a critical nature.

2. Description of the Prior Art

In the space shuttle and the like, substantial vibrations are incurred in the normal use of the shuttle, such as in blastoff, etc. In such shuttles, materials at cryogenic temperatures are conventionally utilized, and more specifically, low temperature fluids may be carried in such shuttles in suitable piping. It is extremely important to minimize the weight of support elements and the like in such applications while yet providing positive resilient support for certain components over the wide range of temperatures which may be encountered in the normal use of the shuttle.

Heretofore, the conventional elastomeric mounting means for use in such environments have not proven satisfactory because of the inability thereof to provide energy absorption for effective damping of the vibrations, and maintained resilient characteristics over the wide range of temperatures to which the supports are subjected in the normal use of the shuttle.

In U.S. Pat. No. 3,704,877, of John Nunes et al, owned by the assignee hereof, an improved one-piece energy controlling device is disclosed which is formed of two different materials having desired energy storage and energy damping characteristics. In one embodiment of the invention disclosed therein, three different metals are used in concentric bonded tubes to define an elongated rod spring. In a helical form of the energy controlling device disclosed in the Nunes et al patent, a plurality of elongated structures are uniformly distributed throughout the cross section of the rod.

SUMMARY OF THE INVENTION

The present invention comprehends an improved resilient energy absorbing support adapted for use over a wide range of temperatures, including cryogenic temperatures such as encountered in space shuttle applications.

More specifically, the invention comprehends such a support including a composite coil defining a core and a tubular sheath with the sheath being formed of a material having higher elastic yield strain limit than that of the core. The coil defines a first coil portion and a second coil portion with means for supporting the coil intermediate the first and second portions. Means are provided for applying a preselected preload to the coil such that an axial vibratory load applied to one of the coil portions equally and oppositely stresses the first and second coil portions, respectively, with the core material of at least one of the coil portions exceeding its elastic yield strain limit while maintaining the sheath of the coil below its elastic yield strain limit whereby the device functions as an effective energy absorbing resilient vibratory load support.

In the illustrated embodiment, the coil portions are vertically coaxially aligned.

In the illustrated embodiment, the preload of the coil is preselected to be one-half the bottoming load whereby application of a load to one coil portion sufficient to bottom that coil portion causes the other coil portion to be substantially fully relaxed. In the illustrated embodiment, the coil portions comprise separate coil elements, and the support means defines a wall member having opposite surfaces engaged respectively by end surfaces of the first and second coil elements.

The illustrated embodiment can incorporate means for having loads applied both axially and/or radially and can be vibrated in both horizontal and vertical directions, yet still functioning in the desired manner.

The means for applying the preselected preload to the coil may include a tie member extending axially through the coil portions, and wall members carried by the tie member to be disposed one each at opposite outer ends of the coil portions with means for urging the wall members toward each other with the coil compressed therebetween. The tie member may extend freely through the supporting means.

The energy absorbing support is adapted for use at relatively low temperatures, such as −150° F. In the illustrated embodiment, the support is adapted to provide maintained resilient characteristics at temperatures down to approximately −320° F.

The invention comprehended herein is unaffected by temperature extremes and other deteriorating conditions, such as oil, water, ozone, dust, sunlight and age.

The coil of the present invention may be formed in any number of composite configurations, some of which are partially enumerated in U.S. Pat. No. 3,704,877. Additionally, many combinations of metals may be used for such composites, including:

titanium, copper, stainless steel, aluminum, iron alloy steels, nickle bas alloys, niobium, tin, lead, copper alloys, tantalum, but not limited thereto.

More specifically, the support of the present invention may be formed with a copper core and a stainless steel sheath. One example of a suitable stainless steel sheath is one formed of 18-8 stainless steel material.

In the illustrated embodiment, the stainless steel sheath may be provided with an outer coating of nickel which may have a thickness less than 25 microns, and more specifically, approximately 10 microns in order to improve appearance and inhibit interfacial corrosion at the exposed edges of the copper and stainless steel.

In the illustrated embodiment the sheath constitutes less than 50% of the cross-sectional area of the composite.

Thus, the energy absorbing resilient support of the present invention is extremely simple and economical of construction while yet providing the improved wide temperature range support functioning discussed above.

BRIEF DESCRIPTION OF THE DRAWING

Other features and advantages of the invention will be apparent from the following description taken in connection with the accompanying drawing wherein:

FIG. 1 is a vertical section illustrating a lightweight energy absorbing resilient support embodying the invention carrying a plurality of tubes such as in a space shuttle application;

FIG. 2 is a fragmentary enlarged vertical cross section illustrating more specifically the support means;

FIG. 3 is a further enlarged vertical section of the spring support;

FIG. 4 is an exploded side elevation thereof;

FIG. 5 is a fragmentary enlarged sectional perspective of a turn of the support coil; and FIG. 6 is a vertical section of a modified form of support embodying the invention.

DESCRIPTION OF THE PREFERRED EMBODIMENTS

Figure 7:
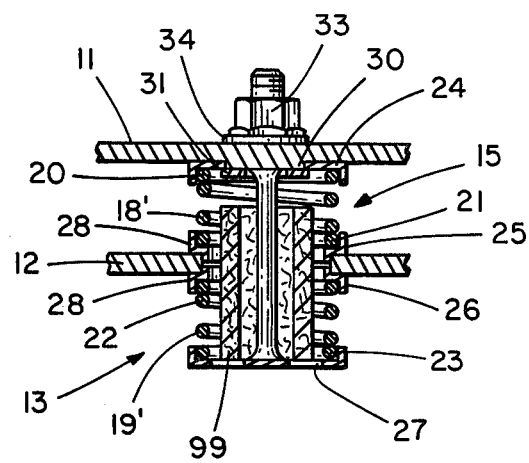
FIG. 7 is a partial cross section view of another embodiment of the invention.

In the exemplary embodiment of the invention as disclosed in FIGS 1-5 of the drawing, a plurality of hoses, or tubes, 10 are carried on a carrier 11 which, in turn, is mounted to a base support 12 by a pair of energy absorbing resilient supports generally designated 13. Support 12 may be mounted to a wall 14 of an apparatus, such as a space shuttle. Thus, the spring supports 13 may be subjected to extremely strong vibratory loads and widely varying temperature conditions which, in the space environment, may be substantially below −150° F. The spring supports 13 are adapted for maintained resilient characteristics at temperatures such as cryogenic temperatures as low as −320° F.

Figure 8:
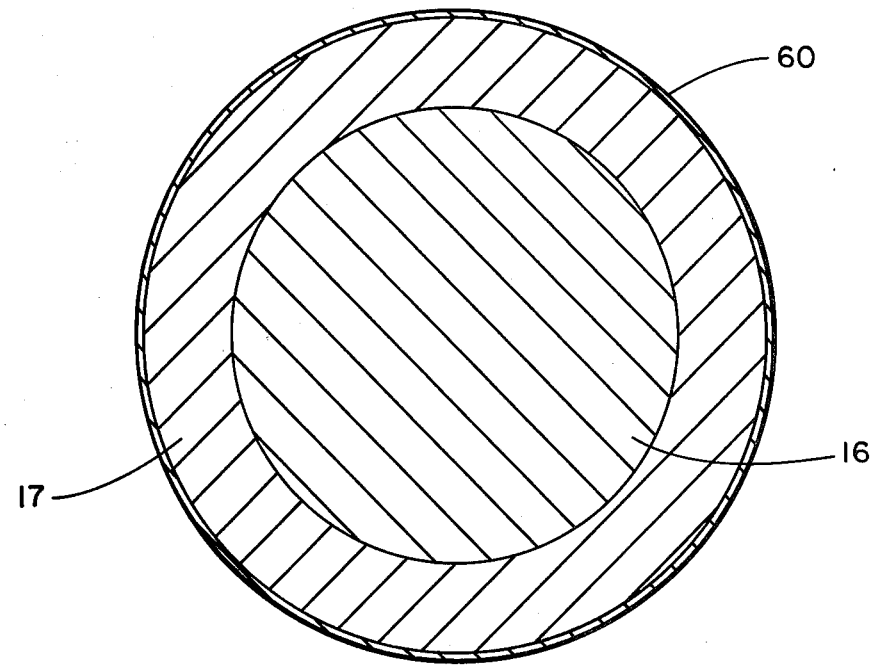
FIG. 8 is an enlarged cross sectional view of one of the embodiments of the invention.

The spring support of the present invention comprises a composite coil generally designated 15 formed of a helically arranged rod having a core 16 and an outer sheath 17. As shown in FIG. 5, the helical composite rod may have a sheath constituting less than 50% of the cross-sectional area of the composite. The materials of the rod are preselected to provide an energy absorbing function such as disclosed in the Nunes et al U.S. Pat. No. 3,704,877 discussed above. More specifically, the core material is arranged to exceed its elastic yield strain limit while the sheath material is maintained below its elastic yield strain limit during the damping operation of the device. In the illustrated embodiment, the core is formed of copper and the sheath is formed of a stainless steel material, such as 18-8 stainless steel. A thin layer of nickel 60 may be electroplated on the sheath and illustratively may have a thickness of less than 25 microns. In the illustrated embodiment in FIG. 8, the nickel layer has a thickness of approximately 10 microns.

The rod material may be fabricated by a drawing process wherein a 0.081 inch diameter rod is formed by cladding an 18-8 stainless steel tube having a 0.5 inch outer diameter and a 0.035 inch wall thickness over a 0.425 inch copper core. The clad copper wire is then drawn by 20% B and S reduction passes in a wire drawing operation to a 0.325 inch outer diameter. This material is then annealed at 1900° F. at 1 second per mil. The annealed material is then further drawn to provide a 20% further reduction to 0.204 inch outer diameter and again annealed at 1900° F. for 1 second per mil. A final 20% drawing reduction is effected to reduce the outer diameter of 0.081 inch with the material being 84% cold worked.

The reduced composite is then cleaned and coil wound into a single closed end helical compression spring arrangement with the ends of the spring ground flat by conventional means. The spring is then electroplated with nickel to a 10-micron thickness and the plated spring is heat treated at 750° F. for 2½ hours in an Argon atmosphere.

Coil 15 includes a pair of such springs including a first, upper spring 18 and a second, lower spring 19. The upper spring defines an upper end 20 and a lower end 21 and the lower spring defines an upper end 22 and a lower end 23. As shown in FIG. 3, spring end 20 is received in a cup-shaped spring retainer 24, spring end 21 is received in a cup-shaped spring retainer 25, spring end 22 is received in a cup-shaped spring retainer 26, and spring end 23 is received in a cup-shaped spring retainer 27. The spring retainers 25 and 26 are provided with cooperating annular recesses 28 for receiving the edge of the support 12 between the retainers for supporting the coil 15 at its mid-portion on the support 12.

A tie rod 29 is provided upstanding from retainer 27 and passing freely through the spring retainers 25, 26 and 24 to have a collar 30 on an upper portion of the rod received in an upwardly opening recess 31 of the upper spring retainer 24.

As best seen in FIG. 4, the tie rod further includes an upper threaded portion 32 which projects through the carrier wall 11 (FIG. 3) which receives a nut 33 and washer 34 for clamping the carrier 11 to the collar 30, thereby to mount the carrier 11 to the coil 15 for improved energy absorbing resilient support of the tubes 10.

The nut 33 is adjusted on rod portion 32 so as to provide a preselected preloading of the coil springs 18 and 19 and in the illustrated embodiment, the preloading is equal to approximately one-half the bottoming load of the springs. Thus, when a vibration occurs causing the load to bottom on one of the springs, the other spring substantially fully relaxes with only a residual load for maintaining the spring ends in contact with the spring retainers.

A resilient support made in accordance with the invention has been tested and found to have maintained resilient characteristics at a temperature of −320° F. after cycling for 100 times at that temperature. As space shuttle applications may involve environmental temperatures of approximately −150° F or less, the present support provides an improved reliable, low cost and lightweight support for such applications.

Referring to FIG. 6, a modified form of energy absorbing resilient support embodying the invention is shown to comprise a support 113 generally similar to support 13 of the above discussed embodiment but having a modified structure wherein the load is carried on the upper end of an axial rod 135 having a collar 136 at its lower end disposed between the two springs 18 and 19. Spring 19 is bottomed on a lower support 137 and spring 18 is compressed between collar 136 and an upper support 138 with the supports being secured in spaced adjusted relationship by a plurality of tie rods 139 and nuts 140.

Support 113 functions generally similar to support 13 in providing an energy absorbing resilient support of the load by means of a pair of composite coil springs extending oppositely from a center wall member with the coil springs being alternatively compressed and extended as a result of vibratory movement of the load on the support. Preloading of the coil springs 18 and 19 is effected by suitable adjustment of nuts 140 and, thus, the support 113 functions generally similar to support 13 as discussed above.

A comparison of the two illustrated supports is shown in the following table:

| Mount Type | $P_{st}$ (lbs.) | $f_n$ at $P_{st}$ (Hz) | $T_A$ | | Constant Vibration Inputs | |
|---|---|---|---|---|---|---|
| | | | $f_n$ | $5f_n$ | D.A. (in.) | Cross-over (g's) |
| FIG. 6 | 20 | 15 | 5.4 | 0.06 | 0.04 | 5 |
| | | | | | 5 to 50 Hz | 50 to 2000 Hz |
| FIG. 3 | 2 | 21 | 8.1 | 0.02 | 0.02 | 15 |

-continued

| Mount Type | $P_{st}$ (lbs.) | $f_n$ at $P_{st}$ (Hz) | $T_A$ | | Constant Vibration Inputs | |
|---|---|---|---|---|---|---|
| | | | $f_n$ | $5f_n$ | D.A. (in.) | Cross-over (g's) |
| | | | | | 5 to 120 Hz | 120 to 2000 Hz |

$P_{st}$ = static load
$f_n$ = natural frequency of the spring-mass system
$T_A$ = absolute transmissibility, the ratio of the output to the vibratory input
D.A. = double amplitude constant input displacement
Cross-over = constant g force input g's Because of the superior isolation efficiency of the invention, as illustrated by the extremely low values of $T_A$ at $5f_n$ shown on the above table, compared to the high values of an elastomeric support, the invention may be used with significantly lighter weight secondary support structures. Illustratively, frequency range at 20 to 2000 Hz., the support 13 had a transmissibility of 2, whereas a similarly tested elastomeric support had a transmissibility of 20.

Another desirable advantage of the support structure of the present invention is the long, useful life thereof. Illustratively, one such support has been tested in excess of 11,500,000 cycles for an input amplitude of 0.024 inch and at resonance has proven successful in simulated space shuttle mission tests, including launch and re-entry vibratory conditions.

In another embodiment of the invention, a mass of resilient woven, knitted or non-woven metal fabric 99 is used to fill the cavities of the upper spring 18' and the lower spring 19' as shown in FIG. 7. These types of fabrics located within the cavities provide frictional damping at resonance enhancing the operation of the support by adding an additional damping element.

By permitting the use of lighter weight supports, a substantial advantage is obtained in environments, such as space shuttle environments, where weight is at maximum premium. Further, because of the small size of the supports, increased available haulage space is provided which, again, is at maximum premium in such space shuttle applications. The improved fatigue life of the supports over such wide temperature range temperatures is further extremely important in applications as where cryogenic materials are being handled by the tube piping carried by the supports and, thus, the support offers further highly desirable advantages in such critical-safety environments.

The foregoing disclosure of specific embodiments is ilustrative of the broad inventive concepts comprehended by the invention.

I claim:
1. An energy absorbing resilient and vibration dampening support comprising:
    composite coil means defining a core and a tubular sheath enclosing the core, the sheath being formed of a material having a higher elastic yield strain limit than that of the core, said coil means defining a first coil portion and a second coil portion;
    means for supporting the coil means intermediate said first and second coil portions; and
    means for applying a preselected preload to said coil means such that an axial vibratory load applied to one of said coil portions equally and oppositely stresses said first and second coil portions respectively with the core material of at least one of said coil portions exceeding its elastic yield strain limit while maintaining the sheath of the coil means below its elastic yield strain limit whereby the unit functions as an energy absorbing resilient vibratory load support by which the arrangement of the material comprising the coils provides means for vibration damping.

2. The energy absorbing support of claim 1 wherein said coil portions are vertically, coaxially aligned.

3. The energy absorbing support of claim 1 wherein said preload is preselected to be approximately one-half the bottoming load of said coil means whereby application of a load to said one coil portion sufficient to bottom one of said coil portions causes the other coil portion to be substantially fully relaxed.

4. The energy absorbing support of claim 1 wherein said coil portions comprise individual coil elements.

5. The energy absorbing support of claim 4 wherein the coil portions are filled with resilient metal fabric.

6. The energy absorbing support of claim 1 wherein said coil portions comprise individual coil elements and said support means defines a wall member having one surface engaged by said first coil element and an opposite surface engaged by said second coil element.

7. The energy absorbing support of claim 1 wherein said means for applying said preselected preload to said coil means comprises a tie member extending axially through said coil portions, wall members carried by the tie member to be disposed one each at the opposite outer ends of the coil portions, and means for urging said wall members toward each other with said coil means compressed therebetween.

8. The energy absorbing support of claim 1 wherein said means for applying said preselected preload to said coil means comprises a tie member extending axially through said coil portions, wall members carried by the tie member to be disposed one each at the opposite outer ends of the coil portions, and means for urging said wall members toward each other with said coil means compressed therebetween, said tie member extending freely through said means for supporting the coil means.

9. The energy absorbing support of claim 1 wherein said core is formed of copper material.

10. The energy absorbing support of claim 1 wherein said sheath is formed of stainless steel material.

11. The energy absorbing support of claim 1 wherein said core and sheath materials comprise materials preselected to have maintained elastic characteristics at temperatures down to at least approximately $-150°$ F.

12. The energy absorbing support of claim 1 wherein said core and sheath materials comprise materials preselected to have maintained elastic characteristics at temperatures down to at least approximately $-320°$ F.

13. The energy absorbing support of claim 1 wherein said sheath is formed of stainless steel having an outer coating of nickel.

14. The energy absorbing support of claim 1 wherein said sheath is formed of stainless steel having an outer coating of nickel having a thickness of approximately 10 microns.

15. The energy absorbing support spring of claim 1 wherein said sheath includes an outer layer of nickel having a thickness of less than approximately 25 microns.

16. The energy absorbing support spring of claim 15 wherein said sheath is formed of 18-8 type stainless steel.

17. The energy absorbing support spring of claim 1 wherein said sheath constitutes less than approximately 50% of the cross-sectional area of the composite.

* * * * *